(No Model.) 2 Sheets—Sheet 1.
W. H. SCHEER.
HAY LOADER.
No. 512,908. Patented Jan. 16, 1894.
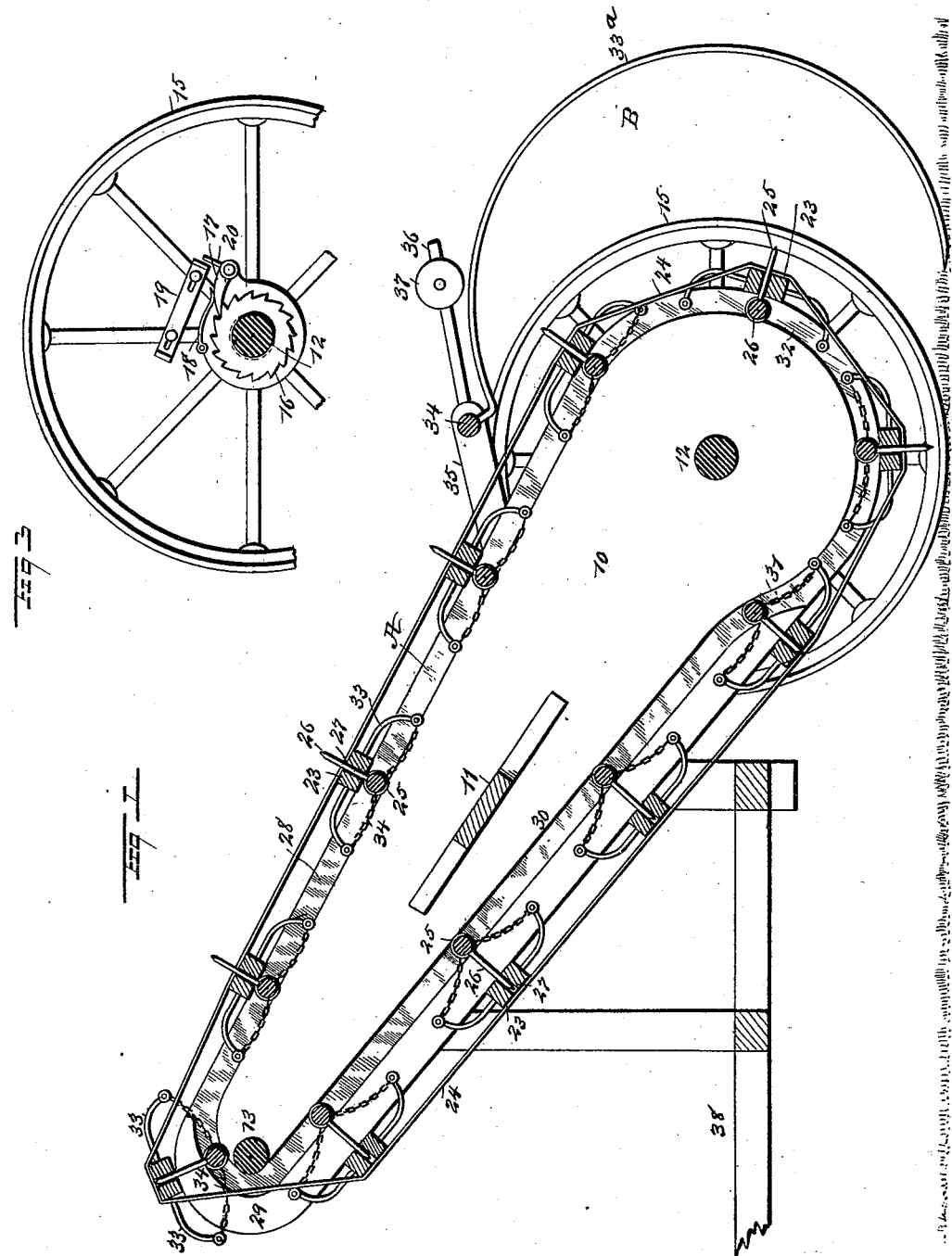
WITNESSES:
H. Walker
C. Sedgwick
INVENTOR
W. H. Scheer
BY
Munn & Co
ATTORNEYS.

(No Model.) 2 Sheets—Sheet 2.
W. H. SCHEER.
HAY LOADER.
No. 512,908. Patented Jan. 16, 1894.
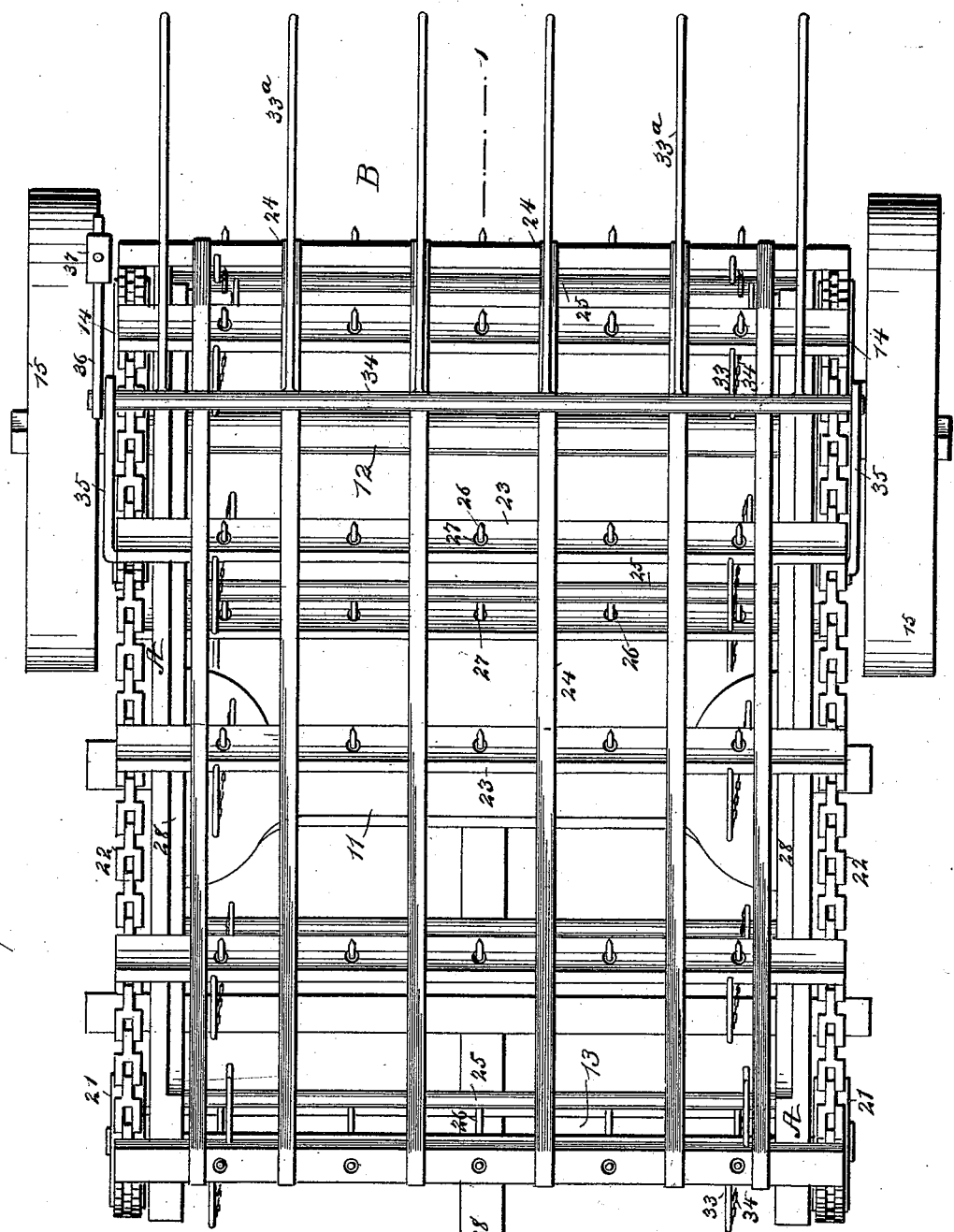
WITNESSES:
H. Walker
C. Sedgwick
INVENTOR
W. H. Scheer
BY
Munn & Co
ATTORNEYS.

UNITED STATES PATENT OFFICE.

WILLIAM H. SCHEER, OF FRANKFORT, ILLINOIS.

HAY-LOADER.

SPECIFICATION forming part of Letters Patent No. 512,908, dated January 16, 1894.

Application filed December 5, 1892. Serial No. 454,074. (No model.)

*To all whom it may concern:*

Be it known that I, WILLIAM H. SCHEER, of Frankfort Station, in the county of Will and State of Illinois, have invented a new and Improved Hay-Loader, of which the following is a full, clear, and exact description.

My invention relates to an improvement in hay loaders, and has for its object to construct a hay loader in such manner that it will gather the hay from the ground, remove the hay cleanly from the gatherer and elevate the hay, delivering it as elevated to a wagon or other receptacle placed to receive it.

Another feature of the invention is to provide the conveyer with teeth so constructed that when the conveyer is upon its upward travel the teeth will be fully exposed, and when the conveyer is upon its return movement its teeth will be practically concealed and fully protected, the teeth being first exposed when the gatherer or rake is closely approached.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a central vertical section through the hay loader, the said section being taken practically on the line 1—1 of Fig. 2. Fig. 2 is a plan view of the loader; and Fig. 3 is a detail view, illustrating the ratchet connection between the supporting wheels of the loader and the axle operating the conveyer.

In carrying out the invention the main frame of the hay loader consists of two side pieces 10, which are preferably given a slightly tapering form, being narrowest at the upper end, as the frame is adapted to stand at an acute angle to the ground. The side pieces are usually connected at or near their centers by one or more cross bars 11; and in the lower portion of the frame an axle 12, is journaled, while a shaft 13, is journaled in the upper portion of the frame. The axle 12, is virtually a shaft as it has secured at each outer end a chain wheel 14, the chain wheels being located quite close to the outer side faces of the frame; and the shaft or axle 12, has also loosely mounted upon its extremities the supporting wheels 15 of the loader. The supporting wheels are free to turn, and are also adapted, when the machine or loader is drawn forward, to revolve the lower shaft or axle 12, and this is usually accomplished by the mechanism illustrated in Fig. 3. This mechanism consists in attaching to the axle between the chain wheels and the supporting wheels, ratchet wheels 16, the teeth of the ratchet wheels facing the rear of the machine.

A dog 17, is pivoted upon the hub portion of each supporting wheel, and the dogs are kept in engagement with the ratchet wheels through the medium of springs 18. The dogs may be removed entirely from engagement with the ratchet wheels by means of a lever of any description; preferably, however, this is accomplished by placing upon the spokes of the supporting wheels slides 19, the slides being so arranged that they may be brought into engagement with arms or pins 20, projected from the rear of the dogs. Thus by forcing the slides rearward until they strike the arms 20 of the dogs the latter are removed from the ratchet wheel, and then the slides may be secured in their rearward position. The moment that the slides are disengaged from the dogs the latter will be forced by their springs 18 to an engagement with the ratchet wheels.

Chain wheels 21, are secured to the extremities of the upper shaft 13, and endless chains 22, are passed over the sprocket wheels 14 and 21 at each side of the frame. These chains form a portion of the conveyer of the machine, and in the conveyer lie the especial features of novelty.

The conveyer is constructed by securing to the chain belts a series of slats 23, the slats being attached in any suitable or approved manner at their ends to the outer faces of the chains; and the slats when the chains are revolved, pass freely over the top of the frame around its ends and along its under face. In addition to the slats 23 a series of intermediate belts 24, is provided, and these belts cross all of the slats in the conveyer; the belts are arranged at such intervals apart as is found most advantageous for supporting the hay. A bar 25, is located immediately beneath each slat, and each of these bars is provided with a series of teeth 26, the teeth being made to extend into and through apertures or openings 27 made in the bars, so that the teeth may be projected beyond the outer faces of the bars at certain periods in the travel of the conveyer. The bars 25, are not as long as the slats, and are preferably circular in cross section, especially at their extremities; the extremities of all of the bars 25, are made to travel in grooves A, the grooves being produced in the inner face of each side piece of the frame. The grooves extend along the sides of the frame parallel with and near the upper edge thereof, this portion of the grooves being designated in the drawings as 28. Leaving the upper edge of the sides of the frame the grooves at the top of the frame are carried in a curved line downward, the upper curved portion of the grooves being designated as 29; and at this point it may be stated that both the upper and lower ends of the sides of the frame are made cylindrical. The lower stretch of each groove extends from the lower portion of the upper cylindrical section 29, and is carried downward practically parallel to the lower edge of the sides yet some distance from said edge, as shown at 30 in Fig. 1, and when the lower ends of the sides of the grooves are carried in a curved line downward to the lower edge of the sides, the grooves then follow the edge until they merge again into the upper section 28. The downwardly-curved portion of the lower section 30 of the groove is designated as 31 in the drawings, and the lower marginal portion of the groove is designated as 32. The toothed bars 25, are prevented from dropping too great a distance when they reach the lower portion of the grooves, they being at that time not supported, by projecting arms 33 from opposite sides of the slats, and attaching the bars to the arms by chains 34 or their equivalents.

The operation of the conveyer is as follows: The moment the slats of the conveyer commence to ascend at the bottom of the frame, the bars at the back of those slats will be forced to a close engagement with the under faces of these slats, and the teeth carried by the bars will be made to project a considerable distance beyond the outer faces of the slats, and the teeth will continue in this position until the slats have reached the upper portion of the frame, whereupon the bars will enter the upper curved sections 29 of the grooves A, while the slats will pass around the upper edges of the frame, and the said section 29 of the grooves is so far removed from the outer edges of the frame sides that the teeth of the bars back of the slats passing over the top of the frame will be drawn almost entirely from the slats, and in this manner the slats and bars will pass downward in the lower stretch of the conveyer, and the teeth will continue to be hidden by the slats until the bars 25, enter the lower curved portions 31 of the grooves A, at which time the bars will commence to approach the slats, and as the slats commence their upward movement engage with the slats and force the teeth through the latter, as shown in Fig. 1. In connection with the conveyer a rake B, is employed. The rake teeth 33ª, are secured to a rake head 34, and the rake head is journaled in brackets 35, projected upwardly and rearwardly from the sides of the frame, the teeth 33ª, curving downward and forwardly over and under the lower portion of the conveyer, the teeth of the rake being so placed that the teeth of the conveyer will pass between the rake teeth. The rake teeth at their upper ends are carried vertically downward from the rake head a predetermined distance, so that the conveyer teeth will pass directly beneath the rake head and in a parallel line with the upper portion of the teeth. The rake teeth are raised and lowered through the medium of a lever 36, which is attached to the rake head, and said lever is preferably connected with a weight 37, serving to hold the rake teeth normally in engagement with the ground. Thus in the operation of the machine, as it is drawn forward, the rake teeth gather or rake up the hay and hold the hay until the conveyer teeth in passing around the upper stretch of the conveyer take the hay from the rake teeth and carry it upward to the upper portion of the frame, and when this portion of the frame is reached the conveyer teeth disappear from the upper face of the conveyer and no obstruction is thereby offered to the perfect dumping of the hay into the wagon or other receptacle located in front of the machine and traveling with it.

The loader is provided with the usual tongue 38, for attachment to the wagon to be loaded.

Having thus described my invention, I claim as new and desire to secure by Letters Patent—

1. In a hay loader, the combination with an inclined frame having grooves in its sides arranged at different distances from the edge of said sides, and a conveyer traveling over the frame and provided with transverse slats extending over the sides of the frame and provided with openings, of bars flexibly connected with slats of the conveyer and having their ends projecting into the said grooves, and teeth carried by the bars and projecting through the openings of the said slats, substantially as described.

2. In a hay loader, the combination, with a frame having grooves in its sides arranged at different distances from the edge of said sides, and a conveyer traveling over the frame and provided with transverse slats extending over the sides of the frame, of bars the ends of which are located in the grooves of the frame, teeth carried by the bars, extending through and having movement in the slats of the conveyer, supporting devices carried by the conveyer and flexibly connected with the teeth-carrying bars, and a driving mechanism imparting movement to the conveyer as the machine is drawn forward, as and for the purpose set forth.

3. In a hay loader, the combination with a frame having grooves in its sides arranged at different distances from the edge of said sides, and a conveyer traveling over the frame and provided with transverse apertured slats, of bars arranged below the slats and having their ends projecting into the grooves of the sides, teeth carried by the bars and projecting into the apertures of the slats, arms projecting from the slats and chains or their equivalents connected to the arms and bars, substantially as described.

WILLIAM H. SCHEER.

Witnesses:
W. H. BECHSTEIN,
JOHN LIESS.